May 13, 1969 WANG YANG 3,444,514
VEHICLE MOTION SIGNALLING SYSTEM
Original Filed June 28, 1965
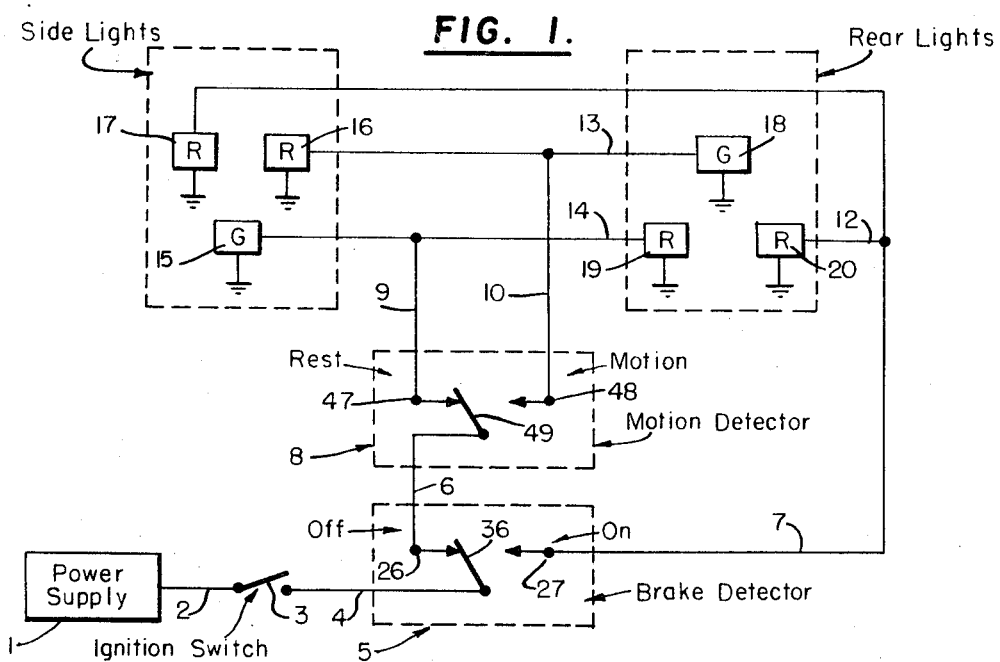
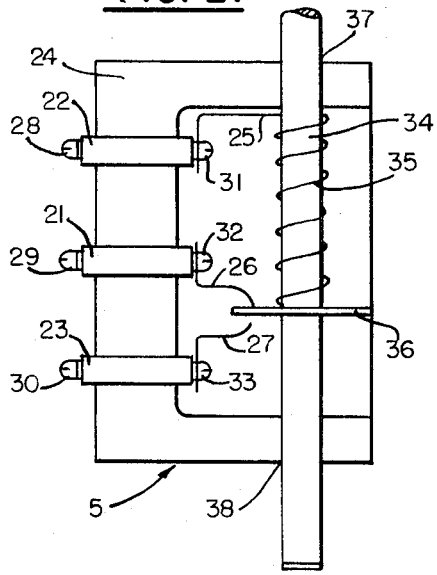
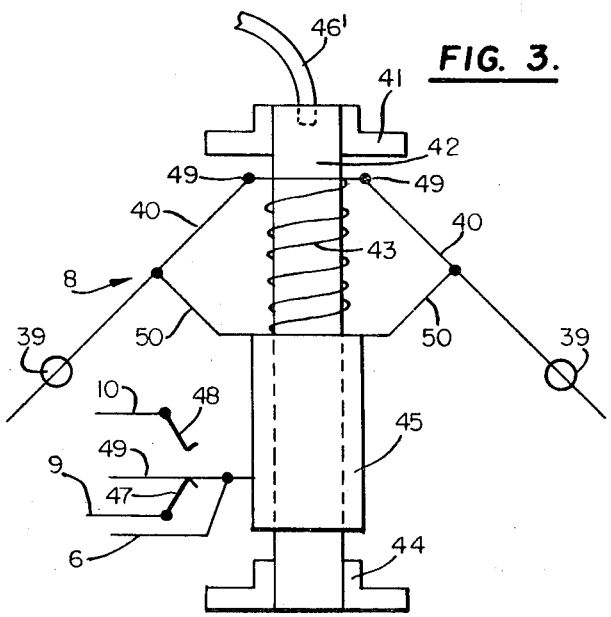
INVENTOR
Wang Yang
BY Hall, Pollock & Vande Sand
ATTORNEY

United States Patent Office 3,444,514
Patented May 13, 1969

3,444,514
VEHICLE MOTION SIGNALLING SYSTEM
Yang Wang, 2, 18 Alley, Lane 360, Wu (Five),
Chang St., P.O. Box 22577, Taipei, Taiwan
Continuation of application Ser. No. 469,367, June 28,
1965. This application Oct. 4, 1967, Ser. No. 672,930
Int. Cl. B60q *1/34, 1/44*
U.S. Cl. 340—66                1 Claim

ABSTRACT OF THE DISCLOSURE

The disclosure relates to a signalling system for automobiles which is arranged to signal both rearwardly of the automobile and to the side. Two indications are provided, one non-restrictive and the other restrictive. A motion detecting unit is included which allows the signal system to respond to both brake conditions and motion conditions. The signal lamps are arranged to give appropriate signal indications in the appropriate directions under each of the different driving conditions of the automobiles.

---

This is a continuation of application Ser. No. 469,367, filed June 28, 1965, now abandoned.

Present automobile signal systems provide signalling based on only one factor; namely, the condition of the braking system. Such signalling is effected by an energized red light directed rearwardly of the automobile. Since a rearwardly directed red light is normally lighted when the automobile light system is energized, a change in the braking condition under these circumstances is reflected only by a change of intensity of said light. This arrangement is unsatisfactory for the reason that the change in intensity can easily be overlooked, resulting in a hazardous situation. It is, therefore, one object of this invention to provide two rearwardly directed signal lights, of different color, so that a change in braking condition, even at night, results in a signal indication which is more readily discernible than presently provided for.

Another defect in present automobile signalling systems is their reliance on one factor only; namely, the condition of the automobile braking system. It is apparent that in addition to the braking factor, another important factor is the presence or absence of automobile motion. Another object of the present invention is to signal the presence or absence of motion in addition to the condition of the automobile braking system.

Present automobile signal systems confine the signal indication to the rear of the automobile. Automobiles approaching from the sides, such as on intersecting streets, cannot observe any signal indication. Therefore, another object of this invention is to provide signal indications observable from the side, as well as from the rear of an automobile. The combination of the side signalling and motion signalling result in an entirely new function for automobile signal systems. When these features are combined, it is possible to signal side-approaching automobiles that the signalling automobile is stopped, or not, and therefore either it is safe, or not safe, to proceed across the path of the signalling automobile.

Various other objects of the invention will become apparent from the following description when read in conjunction with the accompanying drawings in which:

FIGURE 1 is a circuit diagram in schematic form of the present invention;

FIGURE 2 is a diagram of the brake detector switch; and

FIGURE 3 is a diagram of the motion detecting switch.

FIGURE 1 disclosed, in schematic form, the preferred circuit of the present invention. Power supply 1 comprises a conventional automobile power supply of battery and alternator or generator. Connected to the ungrounded terminal of power supply through conductor 2 is one terminal of conventional ignition switch 3. Conductor 4 connects the other terminal of ignition switch 3 to contact 36 of brake detector 5. Brake detector 5 is described in more detail with respect to FIG. 2. The no-brake contact 26 is connected through conductor 6 to contact 49 of motion detector 8. Motion detector 8 is described in more detail with respect to FIG. 3. No-motion contact 47 is connected by conductor 9 to side green light 15 whose other terminal is grounded. Also connected to conductor 9 is conductor 14 connected to rear red light 19 whose other terminal is grounded. Motion contact 48 is connected through conductor 10 to side red light 16 whose other terminal is grounded. Also connected to conductor 10 is conductor 13 which is connected to rear green light 18 whose other terminal is grounded. Brake contact 27 is connected through conductor 7 to side red light 17 whose other terminal is grounded. Also connected to conductor 7 is conductor 12 which is connected to rear red light 20 whose other terminal is grounded.

FIGURE 2 shows the brake detector switch 5. This comprises a housing 24 with rod 34 slideably received through holes 37 and 38. Rod 34 is responsive to fluid pressure in the brake system and the action of spring 35. In the non-braking condition, the fluid pressure on rod 34 cause plate 36 to contact element 26. When the brakes are applied, the change in pressure allows spring 35 to move plate 36 to contact element 27. Plate 36 is in electrical contact with rod 34 which, in turn, is electrically connected to element 25. Element 25 is held by screw 31 to terminal 22. Provision is made for connecting a conductor to terminal 22 by screw 28. In like manner, no-brake element 26 is held by screw 32 to terminal 21 and provision is made for connecting a conductor to terminal 21 by screw 29. Similarly, brake element 27 is held to terminal 23 by screw 33 and provision is made for connecting a conductor to terminal 23 by screw 30.

FIGURE 3 shows the motion dectector unit 8. It comprises a rod 42 fixed for rotation between supports 41 and 44. Rotation is imparted to rod 42 through cable 46, such as a speedometer cable. The cable is rotated through a well-known gear arrangement (not shown) which includes an idler gear which disengages cable 46 when reverse motion is encountered. Affixed to rod 42 through arms 40 are weights 39 so that on rotation of rod 42, the weights 39 and arms 40 will rotate. Arms 40 are attached to pivots 49 so that as the centrifugal force developed during rotation increases, the arms 40 will tend to rise. Follower 45 fits around rod 42 and is raised against action of spring 43 by the upward movement of arms 40 transmitted through arms 50. The spring 43, weights 39, arms 40 and 50 are so chosen that at a predetermined low speed, follower 45 rises a predetermined distance. Attached to follower 45 is contact 49. In the rest position, contact 49 conductively engages contact 47. At the chosen speed, contact 49 is disengaged from contact 47 and engages contact 48 due to the rise of follower 45. Provision is made for attaching suitable conductors to contacts 47, 48 and 49 to enable motion detector 8 to be included in an electrical circuit.

In operation, assuming ignition switch 3 is closed and the automobile is at rest with brakes off, contact 36 engages contact 26 passing current to motion detector 8. Contact 49 will engage no-motion contact 47 energizing side green light 15 and rear red light 19. The energized side green light signifies to automobiles approaching from the side that the signalling automobile is at rest and it is safe to proceed; to automobiles approaching from the rear, the energized rear red light signifies the rest condition of the signalling automobile and the need for evasive action.

Assuming the signalling automobile begins to move, contact 49 will engage motion contact 48 energizing side red light 16 and rear green light 18. The energized side red light signifies to automobiles approaching from the side that it is unsafe to proceed; to automobiles approaching from the rear, the energized rear green light signifies it is now safe to follow.

Assuming now the brakes are applied, while the automobile is in motion, contact 36 will engage brake contact 27 and energize side red light 17 and rear red light 20. This signifies to automobiles approaching from the side that it is unsafe to proceed and cautions automobiles approaching from the rear that some action is required since the signalling automobile is stopping.

The specification has referred to the two signals, non-restrictive and restrictive, as given by green and red lamps, respectively. Obviously, it is within the scope of the invention to use other colors for these two signal indications.

What I claim is:

1. In a vehicle-carried signalling system,
rear mounted signal lamp means,
side mounted signal lamp means,
each said signal lamp means being adapted to provide at least two distinctive signal indications, one being a non-restrictive indication and the other a restrictive indication,
a vehicle brake responsive switch,
vehicle motion responsive means,
first circuit means controlled jointly by both said brake responsive switch and by said vehicle motion responsive means for controlling said rear mounted signal lamp means to display said restrictive signal indication only when the vehicle brakes are applied or when said vehicle is not in motion and to display said non-restrictive signal indication only when said vehicle is in motion and the vehicle brakes are not being applied,
and second circuit means controlled jointly by both said brake-responsive switch and by said vehicle motion responsive means for controlling said side mounted signal lamp means to provide said restrictive indication only when said vehicle is in motion and to provide said non-restrictive indication only when said vehicle is not in motion.

References Cited

UNITED STATES PATENTS 2,685,048 7/1954 Schweitzer.
3,273,117 9/1966 Martauz _____ 340—89 XR ALVIN H. WARING, *Primary Examiner.*

U.S. Cl. X.R.

340—69, 71, 94, 264